(12) United States Patent
Lüftner et al.

(10) Patent No.: US 8,113,671 B2
(45) Date of Patent: Feb. 14, 2012

(54) INTERIOR REAR VIEW MIRROR WITH AN ADDITIONAL DEVICE

(75) Inventors: Robert Lüftner, Dorfprozelten (DE); Hans-Joachim Fuchs, Dorfprozelten (DE)

(73) Assignee: Magna Donnelly Enigeering GmbH, Sailauf (DE)

( * ) Notice: Subject to any disclaimer, the term of this patent is extended or adjusted under 35 U.S.C. 154(b) by 428 days.

(21) Appl. No.: 12/439,107

(22) PCT Filed: Aug. 16, 2007

(86) PCT No.: PCT/DE2007/001446
§ 371 (c)(1),
(2), (4) Date: Feb. 26, 2009

(87) PCT Pub. No.: WO2008/025324
PCT Pub. Date: Mar. 6, 2008

(65) Prior Publication Data
US 2010/0014177 A1   Jan. 21, 2010

(30) Foreign Application Priority Data
Sep. 1, 2006 (DE) ............... 20 2006 013 552 U

(51) Int. Cl.
*G02B 7/182* (2006.01)
(52) U.S. Cl. ..................................... 359/872
(58) Field of Classification Search .......... 359/841, 359/850, 854, 855, 864, 865, 871, 872, 604, 359/265; 248/481, 484
See application file for complete search history.

(56) References Cited

U.S. PATENT DOCUMENTS

| | | | |
|---|---|---|---|
| 3,236,152 A | 2/1966 | Alford | |
| 5,432,496 A | 7/1995 | Lin | |
| 6,902,284 B2 * | 6/2005 | Hutzel et al. | 359/865 |
| 2003/0011905 A1 | 1/2003 | Suyama | |
| 2006/0164230 A1 | 7/2006 | Dewind | |

FOREIGN PATENT DOCUMENTS

| | | |
|---|---|---|
| DE | 3605704 A1 | 8/1987 |
| DE | 19603118 A1 | 9/1996 |
| DE | 10043087 A1 | 3/2002 |
| DE | 10131459 B4 | 1/2003 |
| DE | 20218604 U1 | 2/2003 |
| DE | 10231581 A1 | 1/2004 |

OTHER PUBLICATIONS

"PCT International Search Report dated Dec. 3, 2007 for PCT/DE2007/001446, from which the instant application is based," 2 pgs.
"PCT International Preliminary Report on Patentability dated Mar. 17, 2009, from which the instant application is based," 8 pgs.

* cited by examiner

*Primary Examiner* — Euncha Cherry
(74) *Attorney, Agent, or Firm* — Fredrikson & Byron, PA

(57) ABSTRACT

The invention relates to an interior rear view mirror (01) for arrangement in the interior of a motor vehicle, with a mirror element (02) for observing the traffic following behind, wherein on the housing (03) of the interior rear view mirror (01), an additional device (04) is provided which can be adjusted between an inoperative position in the interior of the housing (03) and a usage position outside the housing (03), wherein the center of gravity (07) of the adjustably mounted additional device (04), during arrangement of the additional device (04) in the inoperative position, lies in a vertical plane which runs parallel to the longitudinal axis of the vehicle and through the center of gravity (06) of the interior rear view mirror (01).

16 Claims, 1 Drawing Sheet

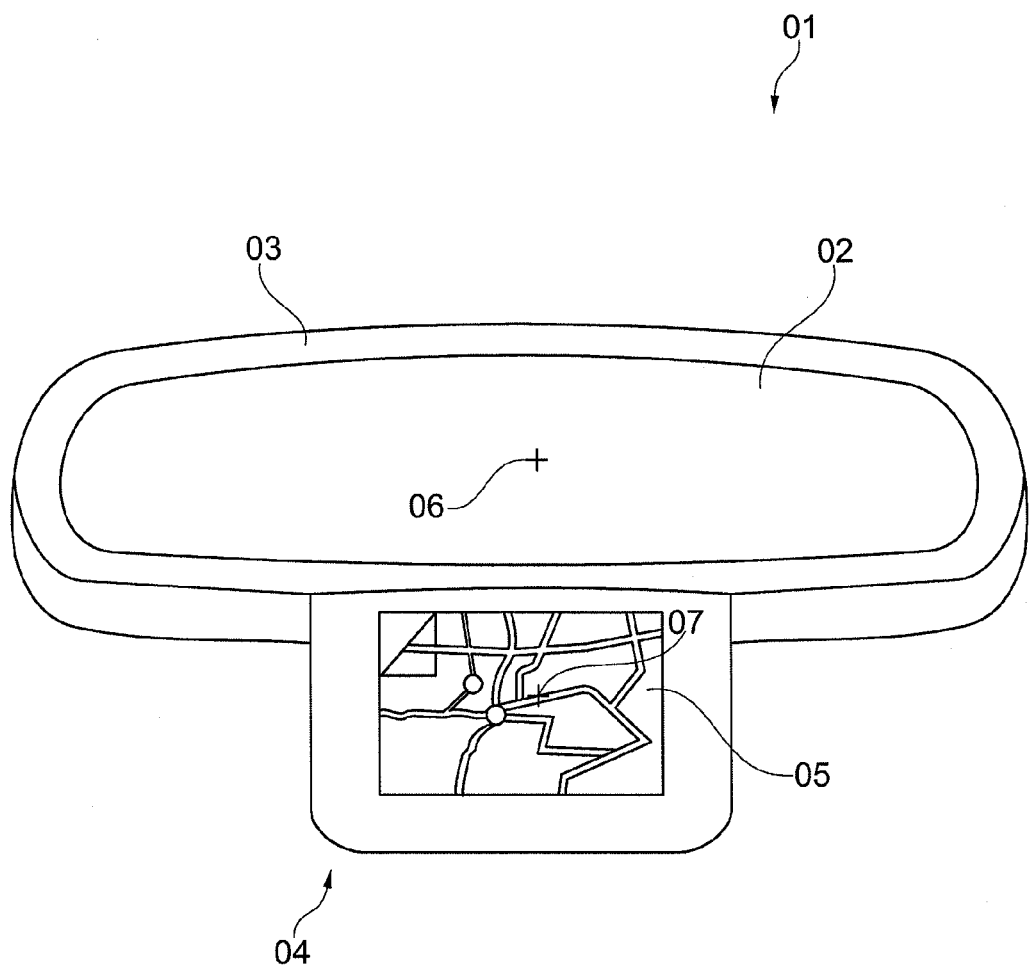

INTERIOR REAR VIEW MIRROR WITH AN ADDITIONAL DEVICE

RELATED APPLICATIONS

This application is a 35 U.S.C. 371 national stage filing from International Application No. PCT/DE2007/001446 filed Aug. 16, 2007, which claims priority to German Utility Model Application No. 20 2006 013 552.9, filed Sep. 1, 2006, the teachings of which are hereby incorporated by reference.

FIELD OF INVENTION

The invention relates to an interior rear view mirror for arrangement in the interior of a motor vehicle.

BACKGROUND

Interior rear view mirrors of the generic kind, in addition to the mirror element for observing the traffic following behind, have an additional device which is mounted adjustably on the housing of the interior rear view mirror. The installation space available within the interior rear view mirror is used for housing the additional device, wherein the additional device can include, for example, a small monitor, or a rack for storage of small parts, or other devices. Known are, for example, interior rear view mirrors with an adjustably mounted video unit which is pulled out when changing into reverse gear and which displays video images of the vehicle interior. Alternatively, in addition, video units mounted on the interior rear view mirror are known by means of which images of the interior camera for observing the passengers within the interior of a motor vehicle can be displayed. Also, navigation displays which are attached to the interior rear view mirror have an increasingly wide distribution.

According to the prior art, the additional devices are pulled out laterally from the interior rear view mirror. In particular, for additional devices with a higher dead weight, such as, for example, video units, this lateral arrangement of the additional devices results in an unfavorable shifting of the center of gravity of the centrically mounted interior mirror. Tests have shown that during the driving operation, primarily vibration forces, which are oriented substantially vertically, are acting upon the interior mirror. Due to the shifting of the center of gravity caused by the additional device, these vertically oriented vibration forces result in the occurrence of visibility distortions due to the increased vibration tendency of the interior rear view mirror. In the worst case, the vibration forces can result in an undesired displacement of the mirror housing by rotation about the longitudinal axis, whereby the driving safety is at risk.

SUMMARY

It is an object of the present invention to propose a new interior rear view mirror with an additional device, which has a lower vibration tendency.

This object is achieved by means of an interior rear view mirror according to embodiments of the invention. In some embodiments, an interior rear view mirror for arrangement in the interior of a motor vehicle, the mirror having a center of gravity and the motor vehicle having a longitudinal axis, includes a housing, a mirror element, and an additional device provided on the housing. The additional device has a center of gravity and may be adjustable between an inoperative position in the interior of the housing and a usage position outside of the housing. The center of gravity of the additional device, throughout a complete adjustment travel from the inoperative position to the usage position, lies in one axis which may run perpendicular to the longitudinal axis of the vehicle substantially vertically in the direction of gravity through the center of gravity of the mirror, such that the vibration forces caused by the weight of the additional device run coaxial to the vibration forces that are caused by the weight of the mirror element and the housing.

The center of gravity of the additional device, during arrangement of the additional device in the inoperative position, may lie in a vertical plane which runs perpendicular to the longitudinal axis of the vehicle and through the center of gravity of the interior rear view mirror. In some such embodiments, the center of gravity of the additional device, during arrangement of the additional device in the usage position, may also lie in the vertical plane which runs parallel to the longitudinal axis of the vehicle and through the center of gravity of the interior rear view mirror. In addition, the center of gravity of the additional device, during arrangement of the additional device in the usage position, may lie in the vertical plane which runs perpendicular to the longitudinal axis of the vehicle and through the center of gravity of the interior rear view mirror.

In some embodiments, the additional device can be adjustably moved upwards and/or downwards out of the housing along a covered adjustment travel, wherein the covered adjustment travel of the center of gravity of the additional device lies in the vertical plane which runs parallel to the longitudinal axis of the vehicle and through the center of gravity of the interior rear view mirror. In some such embodiments, the additional device can be adjustably moved upwards and/or downwards out of the housing along a covered adjustment travel, wherein the covered adjustment travel of the center of gravity of the additional device lies in the vertical plane which runs perpendicular to the longitudinal axis of the vehicle and through the center of gravity of the interior rear view mirror.

In some embodiments, the housing is movably mounted in the interior at an attachment point and the attachment point lies in the vertical plane which runs parallel to the longitudinal axis of the vehicle and through the center of gravity of the interior rear view mirror. The attachment point may lie in the vertical plane which runs perpendicular to the longitudinal axis of the vehicle and through the center of gravity of the interior rear view mirror.

DESCRIPTION OF THE DRAWINGS

FIG. 1 shows an interior rear view mirror according to the invention with an additional device in a perspective front view.

DETAILED DESCRIPTION

The interior rear view mirror according to the invention is based on the fundamental idea that the center of gravity of the additional device lies in a vertical plane which runs parallel to the longitudinal axis of the vehicle and through the center of gravity of the interior rear view mirror. The result of this kind of arrangement is that the vibration forces which are directed vertically downwards from the center of gravity of the additional device act in the same vertical plane parallel to the longitudinal axis of the vehicle as the vibration forces which come from the center of gravity of the interior rear view mirror. This results in that, due to the arrangement in the same vertical plane parallel to the longitudinal axis of the vehicle, no torque acts upon the interior rear view mirror. A rotation of the interior rear view mirror caused by vibration forces is hence excluded to a large extent. Naturally, the prevention of vibrational torques is of utmost importance during normal operation when the additional device, in its inoperative position, is located within the interior rear view mirror. In particular, during the arrangement of the additional device in its inoperative position, the center of gravity of the additional device therefore should lie in the vertical plane which runs parallel to the longitudinal axis of the vehicle and through the center of gravity of the interior rear view mirror.

Furthermore, it is of course advantageous when the center of gravity of the additional device lies at the same time in a vertical plane which runs perpendicular to the longitudinal axis of the vehicle and through the center of gravity of the interior rear view mirror. As a result, the center of gravity of the additional device is located in this case perpendicularly below the center of gravity of the interior rear view mirror.

In order to improve the vibration tendency of the interior rear view mirror not only during the arrangement of the additional device in its inoperative position but also during the arrangement in its usage position, provision can be made, by means of a suitable arrangement of the additional device, that also in the usage position the center of gravity of the additional device lies in a vertical plane which runs parallel to the longitudinal axis of the vehicle and through the center of gravity of the interior rear view mirror.

The same applies, of course, for the arrangement of the center of gravity of the additional device being in usage position in a vertical plane which runs perpendicular to the longitudinal axis of the vehicle and through the center of gravity of the interior rear view mirror.

According to a preferred embodiment of the invention, the additional device can be adjustably moved upwards and/or downwards out of the housing, for example pulled out, wherein the covered adjustment travel of the center of gravity of the additional device lies in the vertical plane which runs parallel to the longitudinal axis of the vehicle and through the center of gravity of the interior rear view mirror.

In addition, it is, of course, also conceivable that the adjustment travel of the center of gravity of the additional device lies at the same time in a vertical plane which runs perpendicular to the longitudinal axis of the vehicle and through the center of gravity of the interior rear view mirror.

In this case, the adjustment travel of the additional device thus runs in a vertical axis through the center of gravity of the interior rear view mirror.

A further improvement of the vibration resistance of the interior rear view mirror arises when the attachment point, by means of which the housing of the interior rear view mirror is movably mounted in the interior of the vehicle, lies in the vertical plane which runs parallel or perpendicular, respectively, to the longitudinal axis of the vehicle and through the center of gravity of the interior rear view mirror.

For which purpose the additional device on the interior rear view mirror serves is principally optional. According to a preferred embodiment, a video unit for displaying optical signals is attached to the additional device. In particular, for the adjustable mounting of navigation displays or camera monitors, respectively, on the interior rear view mirror, the attachment of the additional device according to the invention is of particular advantage because the vibration resistance of the interior rear view mirror remains ensured despite the relatively high weight of these video units.

In which manner the additional device on the interior rear view mirror is adjusted is principally optional. The adjustment can also be carried out in particular manually. According to a preferred embodiment, it is provided that the additional device can be pulled out electro-mechanically, for which an appropriate electromechanical drive is provided within the interior rear view mirror.

Furthermore, it is particularly advantageous when the additional device is pulled out automatically depending on certain operating states. For example, the additional device can be pulled out automatically upon activation of the navigation system or when changing into reverse gear, respectively, to make the navigation display or the camera monitor, respectively, visible for displaying the images of the rear view camera. For certain applications, in addition, it is of advantage when the additional device can selectively be detached from the housing of the interior rear view mirror. In this manner, a navigation device can be used also, for example, outside of the vehicle.

To facilitate the data communication of the vehicle control with additional function modules on the additional device, the additional device can include a communication device for wireless data transfer. For example, a WLan interface or a Bluetooth interface can be provided on the additional device. Moreover, the additional device can be equipped with a separate power supply to be able to operate the additional device independently from the power network of the vehicle.

An embodiment of the invention is schematically illustrated in the drawing and is explained in an exemplary manner hereinafter.

FIG. 1 shows an interior rear view mirror 01 with a mirror element 02 and a housing 03. On the lower side of the housing 03, an additional device 04 is mounted such that it can be pulled out downwards. A navigation display 05 is attached to the additional device 04. The additional device 04, which is shown in FIG. 1 in its pulled-out usage position, can be moved by means of an electromechanical drive into the interior of the housing 03 so that the lower edge of the additional device 04 is flush with the lower edge of the housing 03.

The center of gravity 06 of the interior rear view mirror 01 and the center of gravity 07 of the additional device 04 with the navigation display 05 mounted therein are schematically indicated in FIG. 1. The center of gravity 07 of the additional device 04 is located perpendicularly below the center of gravity 06 of the interior rear view mirror 01 so that the vibration forces caused by the weight of the additional device 04 or the navigation display 05, respectively, run coaxial to the vibration forces which are caused by the weight of the mirror element 02 and the housing 03. The adjustment travel of the center of gravity 07 during the adjustment of the additional device 04 between usage position and inoperative position runs along a vertical axis through the centers of gravity 06 and 07.

As a result, it is thereby ensured that the interior rear view mirror 01 has a high vibration resistance, and undesired rotational movements caused by vibration forces are in principle excluded.

The invention claimed is:

1. An interior rear view mirror for arrangement in the interior of a motor vehicle, the mirror having a center of gravity and the motor vehicle having a longitudinal axis, the mirror comprising: a housing, a mirror element, and an additional device provided on the housing, the additional device having a center of gravity and being adjustable between an inoperative position in the interior of the housing and a usage position outside of the housing, wherein the center of gravity of the additional device, throughout a complete adjustment travel from the inoperative position to the usage position, lies in one axis which runs perpendicular to the longitudinal axis of the vehicle substantially vertically in the direction of gravity through the center of gravity of the mirror, such that the vibration forces caused by the weight of the additional device run coaxial to the vibration forces that are caused by the weight of the mirror element and the housing.

2. The interior rear view mirror according to claim 1, wherein the center of gravity of the additional device, during arrangement of the additional device in the inoperative position, lies in a vertical plane which runs perpendicular to the longitudinal axis of the vehicle and through the center of gravity of the interior rear view mirror.

3. The interior rear view mirror according to claim 2, wherein the center of gravity of the additional device, during arrangement of the additional device in the usage position, lies in the vertical plane which runs parallel to the longitudinal axis of the vehicle and through the center of gravity of the interior rear view mirror.

4. The interior rear view mirror according to claim 3, wherein the center of gravity of the additional device, during arrangement of the additional device in the usage position, lies in the vertical plane which runs perpendicular to the longitudinal axis of the vehicle and through the center of gravity of the interior rear view mirror.

5. The interior rear view mirror according to claim 1, wherein the additional device can be adjustably moved upwards and/or downwards out of the housing along a covered adjustment travel, wherein the covered adjustment travel of the center of gravity of the additional device lies in the vertical plane which runs parallel to the longitudinal axis of the vehicle and through the center of gravity of the interior rear view mirror.

6. The interior rear view mirror according to claim 5, wherein the additional device can be adjustably moved upwards and/or downwards out of the housing along a covered adjustment travel, wherein the covered adjustment travel of the center of gravity of the additional device lies in the vertical plane which runs perpendicular to the longitudinal axis of the vehicle and through the center of gravity of the interior rear view mirror.

7. The interior rear view mirror according to claim 1, wherein the housing is movably mounted in the interior at an attachment point and the attachment point lies in the vertical plane which runs parallel to the longitudinal axis of the vehicle and through the center of gravity of the interior rear view mirror.

8. The interior rear view mirror according to claim 7, wherein the attachment point lies in the vertical plane which runs perpendicular to the longitudinal axis of the vehicle and through the center of gravity of the interior rear view mirror.

9. The interior rear view mirror according to claim 1 further comprising a video unit for displaying optical signals disposed in the additional device.

10. The interior mirror of claim 1, further comprising a navigational display or a camera monitor disposed in the additional device.

11. The interior rear view monitor according to claim 1, wherein the additional device can be pulled out electro-mechanically.

12. The interior rear view mirror according to claim 1, wherein the additional device can be pulled out automatically depending on certain operating states.

13. The interior rear view mirror according to claim 1, wherein the additional device can be detached from the housing of the interior rear view mirror.

14. The interior rear view mirror according to claim 1, wherein the additional device has a communication device for wireless data transfer.

15. The interior rear view mirror of claim 1 wherein the additional device has a WLAN interface or a Bluetooth interface.

16. The interior rear view mirror according to claim 1, wherein the additional device has a power supply which is independent from the power network of the vehicle.

* * * * *